United States Patent
Puschnik et al.

(10) Patent No.: US 11,891,946 B2
(45) Date of Patent: Feb. 6, 2024

(54) CYLINDER HEAD OF AN INTERNAL COMBUSTION ENGINE

(71) Applicant: AVL List GmbH, Graz (AT)

(72) Inventors: Andreas Puschnik, Graz (AT); Christof Knollmayr, Graz (AT); Andreas Zurk, Weinburg (AT); Martin Klampfer, Hitzendorf (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 17/424,876

(22) PCT Filed: Jan. 22, 2020

(86) PCT No.: PCT/AT2020/060016
§ 371 (c)(1),
(2) Date: Jul. 21, 2021

(87) PCT Pub. No.: WO2020/150759
PCT Pub. Date: Jul. 30, 2020

(65) Prior Publication Data
US 2022/0120210 A1    Apr. 21, 2022

(30) Foreign Application Priority Data

Jan. 22, 2019 (AT) .............................. A 50044/2019
Jul. 30, 2019 (AT) .............................. A 50690/2019

(51) Int. Cl.
*F02B 19/12* (2006.01)
*F02F 1/24* (2006.01)

(52) U.S. Cl.
CPC .............. *F02B 19/12* (2013.01); *F02F 1/242* (2013.01); *F02F 2200/00* (2013.01)

(58) Field of Classification Search
CPC ........ F02B 19/12; F02F 1/242; F02F 2200/00
See application file for complete search history.

(56) References Cited

U.S. PATENT DOCUMENTS

| | | | |
|---|---|---|---|
| 9,353,674 B2 * | 5/2016 | Bunce | F02B 19/1057 |
| 2013/0233273 A1 * | 9/2013 | Redtenbacher | F02B 19/1014 |
| | | | 123/253 |
| 2014/0165958 A1 * | 6/2014 | Lee | F02B 19/12 |
| | | | 123/260 |

(Continued)

FOREIGN PATENT DOCUMENTS

| | | |
|---|---|---|
| DE | 69521204 T2 | 6/2002 |
| DE | 102009016466 A1 | 10/2010 |

(Continued)

Primary Examiner — Kurt Philip Liethen
(74) Attorney, Agent, or Firm — Dykema Gossett PLLC

(57) ABSTRACT

Various aspects of the present disclosure are directed to a cylinder head for an internal combustion engine. In one example embodiment, the cylinder head includes at least one spark plug having at least one earth electrode, a precombustion chamber accommodating the at least one spark plug, and a fuel channel which leads into the precombustion chamber. The fuel channel having a flow axis at an outlet that is oriented in the direction of the at least one earth electrode. An axis of rotation of the at least one spark plug has an offset with respect to the flow axis between 0 and 15% of the greatest precombustion chamber diameter.

19 Claims, 3 Drawing Sheets

(56) References Cited

U.S. PATENT DOCUMENTS

| | | | |
|---|---|---|---|
| 2014/0261298 A1* | 9/2014 | Sasidharan | F02B 19/12 |
| | | | 123/286 |
| 2017/0074184 A1* | 3/2017 | Kim | F02P 15/08 |
| 2017/0145900 A1* | 5/2017 | Singh | F02B 19/18 |
| 2018/0258835 A1* | 9/2018 | Anderson | F02B 19/10 |

FOREIGN PATENT DOCUMENTS

| | | | | |
|---|---|---|---|---|
| DE | 102019001163 A1 | | 4/2019 | |
| EP | 2894313 A1 | | 7/2015 | |
| JP | S63162922 A | | 7/1988 | |
| JP | 2001003753 A | | 1/2001 | |
| JP | 2015117581 A | * | 6/2015 | F02B 19/108 |
| WO | 2017029323 A1 | | 2/2017 | |

* cited by examiner

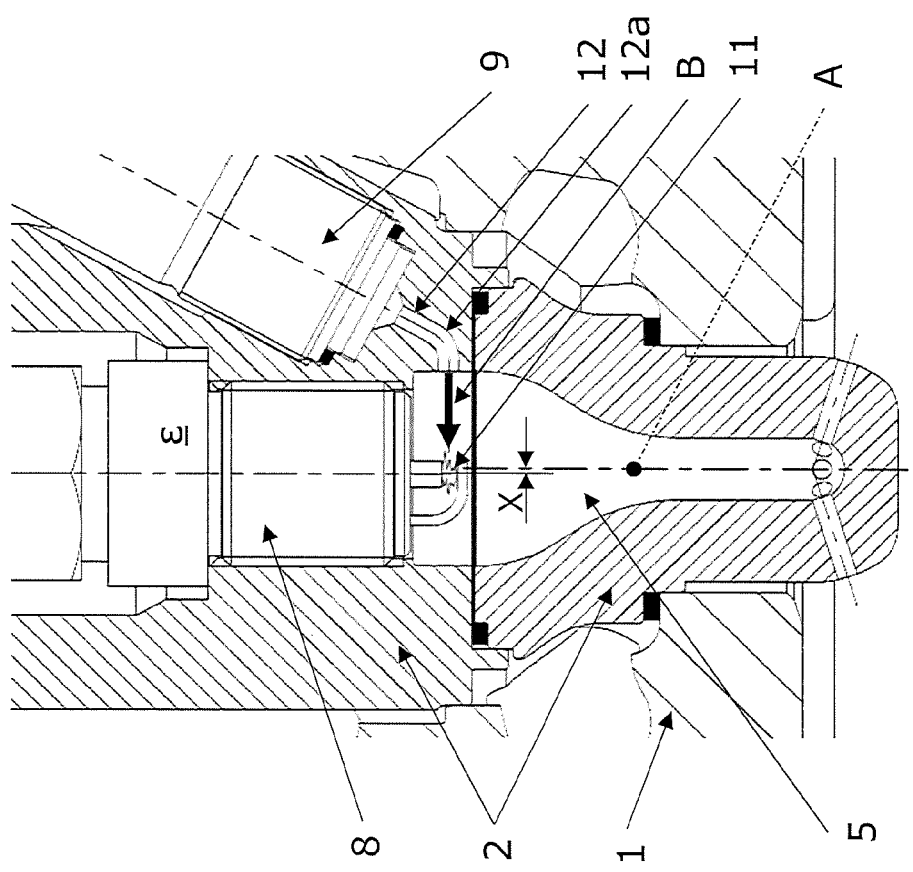
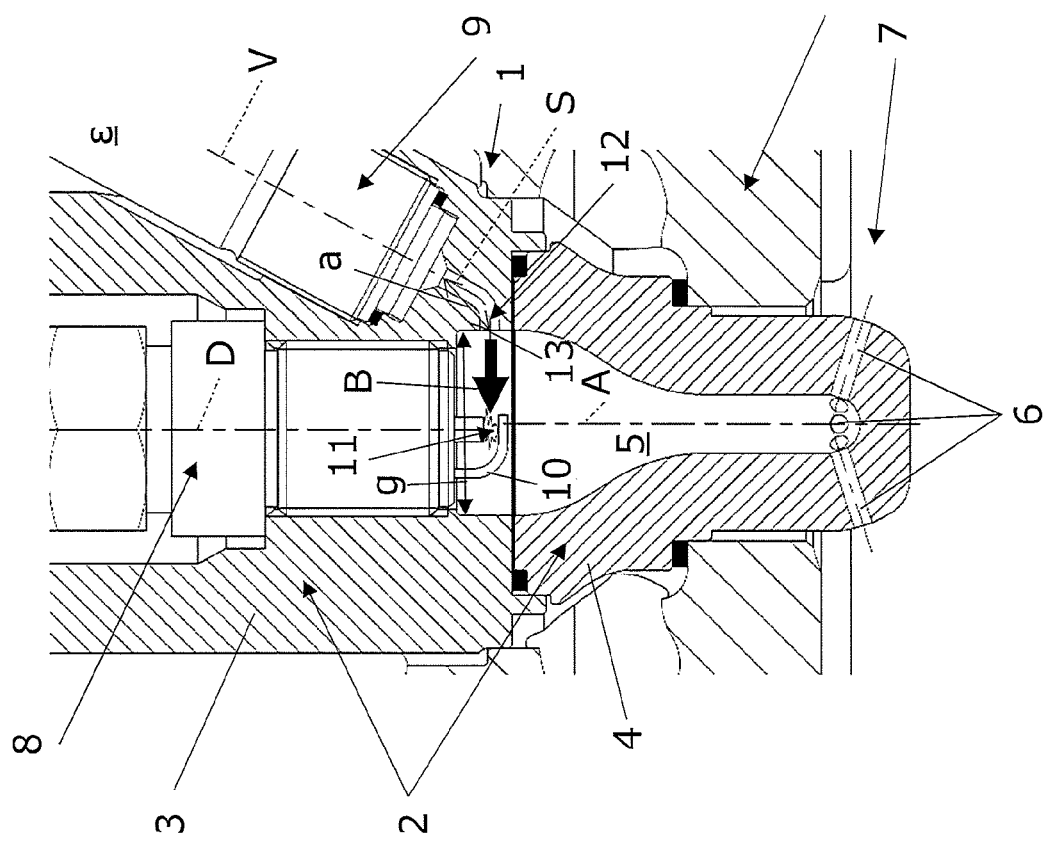

CYLINDER HEAD OF AN INTERNAL COMBUSTION ENGINE

CROSS-REFERENCE TO RELATED APPLICATIONS

This application is a national stage filing based upon International application No. PCT/AT2020/060016, filed 22 Jan. 2020, which claims the benefit of priority to Austria application Nos. A 50044/2019, filed 22 Jan. 2019 and A 50690/2019, filed 30 Jul. 2019.

BACKGROUND

The invention relates to a cylinder head of an internal combustion engine, in particular of a gas engine, comprising at least one spark plug having at least one earth electrode for forming an ignition spark and a precombustion chamber component which accommodates the spark plug and forms a precombustion chamber into which a fuel channel leads which is arranged in the precombustion chamber component, wherein a flow axis of the fuel channel at the outlet of the fuel channel is oriented in the direction of the earth electrode, so that substantially the entire fuel flow flows to the earth electrode.

Furthermore, the invention relates to a method for manufacturing such a cylinder head and an internal combustion engine with the cylinder head.

The internal combustion engine and thus the cylinder head are usually liquid-cooled.

Spark plugs with precombustion chambers are known, for example, from EP 2 894 313 A1 for gas Otto engines. A fuel valve is provided in a sleeve around the spark plug. The sleeve contains a bore which extends from the fuel valve to the precombustion chamber. This bore is arranged at an angle to the axis of the spark plug. In this spark plug, a guide element is provided between the spark plug and fuel valve and the precombustion chamber for better mixing. A combustion chamber of the internal combustion engine is flow-connected to the precombustion chamber via transfer ports. In this particular arrangement, a riser is provided between the precombustion chamber and the transfer port. The disadvantage of this arrangement is that, on the one hand, an additional guide element must be provided to ensure good mixing. Furthermore, the division of the fuel flow results in undesirable flow conditions.

Due to the division of the fuel by the conductive element, the flow is more difficult to predict. As a result, ignitable mixtures can develop away from the earth electrode when the ignition spark is generated, leading to delayed ignition, knocking, uneven combustion and the like. This effect is further intensified by wear phenomena.

It is the object of the present invention to improve ignition.

SUMMARY OF THE INVENTION

This object is solved by the aforementioned cylinder head in that the axis of rotation of the spark plug is offset from the axis of the precombustion chamber, wherein the offset is between 0% and 15% of the greatest precombustion chamber diameter.

Flow axis here means the line connecting the centers of the diameters of the fuel channel to each other. The direction of the flow axis, neglecting any unexpected flow effects due to the fuel valve or the flow downstream of the fuel channel, corresponds approximately to the flow direction of the undisturbed flow at the center of the flow channel.

In view of the general desire in the automotive industry to reduce component sizes, it is advantageous if a flow axis of the fuel channel is curved in at least one direction. This curvature can reduce the inclination of the fuel valve relative to the precombustion chamber axis without having to deal with disruptive flow effects.

By reducing the inclination in this way, the radial size around the axis of the precombustion chamber can be reduced. Reduced sizes can minimize weight, which in turn leads to a reduction in fuel requirements, which in turn is advantageous in terms of environmental protection. Questions of packaging in vehicles are simplified by reduced sizes. Furthermore, a tumble or swirl can be generated by the curvature, which can have a positive effect on mixing in the precombustion chamber.

The targeted flow to the earth electrode makes it possible to transport the ignitable mixture more quickly to the vicinity of the ignition spark. This results in faster and more controllable ignition in the precombustion chamber. Combustion is more uniform and the tendency to knock in the precombustion chamber is reduced.

It is further provided that the axis of rotation of the spark plug is offset from the axis of the precombustion chamber, wherein the offset is between 0% and 15% of the greatest precombustion chamber diameter. This further enhances a quality of combustion and a gas-air mixture can be ignited as uniformly and quickly as possible. Another advantage achieved as a result is that installation space available in a cylinder head is used as efficiently as possible. The combination of the targeted flow to the earth electrode and the small offset of the spark plug from the precombustion chamber axis thus further reinforces the above advantages.

If the offset is 0% or almost 0%, no offset is provided between the axis of rotation of the spark plug and the axis of the precombustion chamber, i.e. these two axes merge substantially without offset.

This object is also solved by an internal combustion engine with a cylinder head according to the invention and by a method for manufacturing a cylinder head according to the invention.

It is favorable if the offset between the axis of rotation of the spark plug and the axis of the precombustion chamber is between 0% and 15%, in particular between 0% and 10%, preferably between 0% and 8%, particularly preferably less than 7% of the greatest precombustion chamber diameter. This allows a quality of ignition and combustion to be further increased. The spark plug is consequently arranged centrally.

It is advantageous if an axis of rotation of the spark plug and the flow axis of the fuel channel lie substantially in one plane and that the flow axis is curved substantially in this plane. As a result, a tumble is achievable. If the fuel channel has a curvature in only one plane, this is useful in manufacturing because it is simplified accordingly.

In the context of the present invention, the phrase "substantially" refers to dimensions and shapes of the item in question that deviate from the exact shape or dimension by a small amount—for example, within the scope of a manufacturing tolerance—because exact realization is not possible.

Particularly favorable flow conditions are achieved when the curvature of the fuel channel encloses an angle between 80° and 160°. This also has advantages for the arrangement of the fuel valve. As a result, the installation space can be further reduced.

In an advantageous embodiment, it is provided that the flow axis in the region of the outlet is arranged substantially normal to an axis of the precombustion chamber, so that the incident flow of the ignition spark is substantially normal to the axis of the precombustion chamber. This is favorable for certain installation spaces.

In an alternative embodiment, on the other hand, for other space conditions or installation spaces, it is provided that the flow axis in the region of the outlet is inclined substantially by an angle with respect to a normal plane through the axis of the precombustion chamber, so that the incident flow of the ignition spark is inclined substantially by an angle with respect to the normal plane through the axis of the precombustion chamber, wherein the angle is between 0 and 30°.

To shorten the distances between the earth electrode and the fuel channel, it is favorable if the outlet of the fuel channel is arranged with the flow axis at the level of the earth electrode along the axis of the precombustion chamber.

It is convenient if the precombustion chamber component has a precombustion chamber shell to form the precombustion chamber and a sleeve around the spark plug, wherein the precombustion chamber shell and the sleeve are each formed in one piece and/or connected to one another. This allows the precombustion chamber component to be easily removed from the cylinder head in the event of ignition problems, making repairs and replacement easier and less costly. If the precombustion chamber shell and sleeve are connected to each other, this can be realized, for example, by a screw connection with a seal. Thus, it may be provided that the sleeve is integrally formed and the precombustion chamber shell is integrally formed and then joined together. However, it may also be the case that the sleeve and the precombustion chamber sleeve are formed together in one piece.

In a special embodiment, it is provided that a fuel valve is arranged in the precombustion chamber component. In this way, leakages can be successfully avoided.

In order to achieve a favorable flow in the fuel channel, in a favorable embodiment it is provided that the flow axis of the fuel channel in a region of the fuel channel adjacent to the fuel valve substantially corresponds to the axis of rotation of the fuel valve. Turbulences downstream of the fuel valve can thus be avoided. However, it may also be provided that the axis of rotation of the fuel valve is not coaxial with the axis of the fuel channel 12, but that an angle of about 0° to about 0° is provided between the two axes.

It is advantageous if the fuel valve is arranged inclined with respect to the axis of the precombustion chamber, wherein this inclination preferably corresponds to an angle between −10° and +35°. By reducing the inclination as mentioned above, an inclination of 0°, i.e. no inclination, can be provided in an extreme case. This would indeed lead to the maximum saving of space. However, the flow in the first area of the fuel channel adjacent to the fuel valve would require a bend or deflection, so that the flow could be negatively affected.

A further increase in this effect is achieved when the offset is in-plane and the earth electrode is positioned facing away from the fuel channel due to the offset with respect to the axis of the precombustion chamber.

In order to gain maximum flexibility with regard to the arrangement of the components, it is envisaged that an axis of rotation of the spark plug has an angle to the axis of the precombustion chamber which is between 0° and 30°.

With respect to the tightness and robustness of the invention, it is advantageous if the fuel channel is formed by a tubular recess along the flow axis within the precombustion chamber component, so that the recess of the fuel channel is surrounded radially around the flow axis by material of the precombustion chamber component.

To facilitate production, it is provided in a favorable variant of the method that the cutting of the spark plug thread for the spark plug in the precombustion chamber component is carried out in such a way that an earth electrode is arranged in a defined position relative to the fuel channel after the screw-in process. In principle, it is favorable if the cylinder head is produced at least in part, in particular the precombustion chamber and/or the spark plug, via 3D printing. In particular, the cylinder head is produced at least in part by the additive manufacturing process of laser melting.

BRIEF DESCRIPTION OF THE DRAWING

The invention is explained in further detail in the figures with reference to non-limiting exemplary embodiments, wherein:

FIG. 1 shows a detail of a cylinder head according to the invention in section in a first embodiment;

FIG. 2 shows an enlarged view of the detail in FIG. 1;

DETAILED DESCRIPTION

Figure 3:
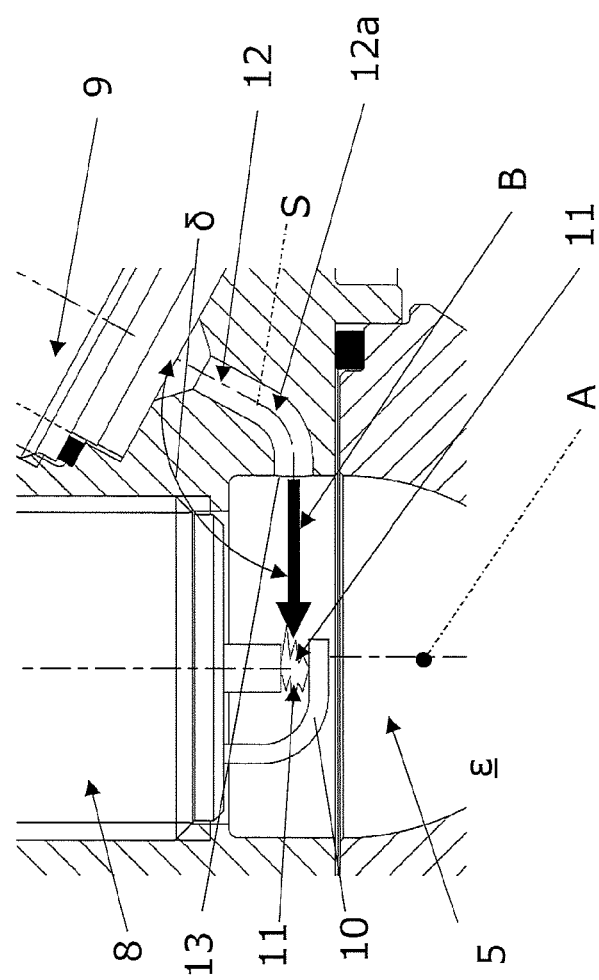
FIG. 3 shows an alternative enlarged view from FIG. 1.

FIG. 1 shows a detail of a liquid-cooled cylinder head 1 in a first embodiment. Here, the cylinder head 1 is part of an internal combustion engine operated as a gas Otto engine. The detail shows a precombustion chamber component 2 in more detail. In the embodiment shown, the precombustion chamber component 2 has a sleeve 3 and a precombustion chamber shell 4 connected to the sleeve 3. Here, the precombustion chamber shell 4 has an external thread and the sleeve 3 has an internal thread. The precombustion chamber shell 4 is screwed to the sleeve 3. A seal is provided between the precombustion chamber shell 4 and the sleeve 3.

The precombustion chamber shell 4 encloses a large part of a precombustion chamber 5, which is flow-connected to a combustion chamber 7 via overflow openings 6. The combustion chamber 7 adjoins the cylinder head 1 with, among other things, the precombustion chamber component 2 and is substantially closed off by it in the direction of the precombustion chamber 5.

A spark plug 8 and a gas valve 9 are arranged inside the sleeve 3. The spark plug 8 extends with an earth electrode 10 into the precombustion chamber 5. An area in which ignition sparks are formed by the spark plug 8 is provided with reference sign 11.

In the first embodiment, the spark plug 8 is aligned with its axis of rotation D parallel to an axis A of the precombustion chamber 5. In the first embodiment shown, the axis of rotation D and the axis A are offset. This axis of rotation D and the axis A are identical in an alternative embodiment.

The fuel valve 9 is arranged along an axis V which corresponds to the axis of rotation of the fuel valve 9. This axis V is aligned at an angle to the axis A of the precombustion chamber.

According to the invention, the fuel valve 9 is connected to the precombustion chamber 5 via a fuel channel 12. The fuel channel 12 extends along a flow axis S. The flow axis S corresponds in its direction to the flow vector of the undisturbed flow inside the fuel channel 12.

The fuel channel 12 has an outlet 13 into the precombustion chamber 5. At least at the outlet 13, the fuel channel 12 is oriented in the direction of the ignition spark 11 and the earth electrode 10. The fuel therefore flows in the direction of the ignition spark 11, as is to be indicated by the arrow B.

The fuel valve 9 is a distance a away from the precombustion chamber 5. This distance a is the distance of the delivery point of fuel from the fuel valve 9 into the fuel channel 12, the inlet of the fuel channel, from the outlet 13 of the fuel channel 12 into the precombustion chamber 5.

In the embodiments shown, the greatest precombustion chamber diameter g is found at the transition to spark plug 8. In these embodiments, the greatest precombustion chamber diameter g is slightly larger than the diameter of spark plug 8. In alternative embodiments, these diameters can be the same.

This arrangement is shown slightly enlarged in FIG. 2. This shows that the axis of rotation D and the axis A of the precombustion chamber 5 have a slight offset x from each other. Thereby, the spark plug 8 is further away from the fuel valve 9 due to the offset x. In the embodiment shown, the axis V of the fuel valve 9 and the axis of rotation D of the spark plug 8 lie in a plane E, which also forms the section plane for the section of FIGS. 1 to 5. Therefore, the image plane is marked with the reference sign for the plane E. The offset x in FIG. 2 is smaller than 10% of the greatest precombustion chamber diameter g.

The fuel channel 12 has a curvature 12a between an inlet with which the fuel channel 12 adjoins the gas valve 9 and the outlet 13. In this case, the flow axis S is curved in the plane E. In alternative embodiments, more complex shapes for the fuel channel 12 are also possible.

For clarity purposes, not all components in FIG. 2 have been labeled. The missing reference signs can be taken from FIG. 1.

FIG. 3 shows a section of FIG. 1 and FIG. 2, in which the spark plug 8 with the earth electrode 10, as well as the ignition spark 11, are clearly visible.

Gas is discharged into the fuel channel 12 through the fuel valve 9. The fuel channel 12 deflects the fuel flow B substantially along the flow axis S and at the outlet 13 the flow B is directed towards the earth electrode 10. The ignition spark 11 is created between the earth electrode 10 and the main part of the spark plug 8. The gas, the fuel, is ignited immediately by the flow B in the direction of the ignition spark B.

In this case, the outlet 13 of the fuel channel 12 is arranged with the flow axis S at the level of the ignition spark 11 and the flow B of the fuel is discharged approximately along an unmarked normal plane of the axis A of the precombustion chamber 5 in the direction of the ignition spark 11.

The curvature 12a thereby deflects the flow axis S by an angle δ.

Figure 4:
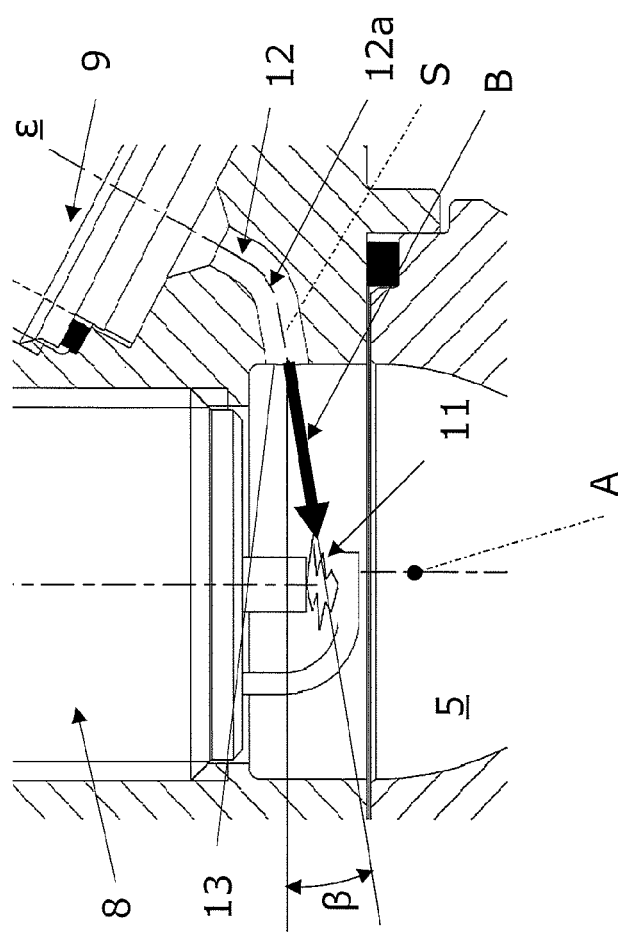
FIG. 4 shows a detail of a cylinder head according to the invention in section in a second embodiment.

FIG. 4 shows a detail analogous to FIG. 3 of a second version of the cylinder head 1 according to the invention. In the following, only the differences to the first embodiment are explained. Identical reference signs indicate components with the same functions.

In contrast to the first embodiment, in the second embodiment the outlet 13 is not arranged at the same height along the axis A of the precombustion chamber 5. In this case, the flow axis S at the outlet 13 is assigned closer to the spark plug 8 compared to the first embodiment.

The flow axis S is inclined by an angle β in the area of the outlet 8. In this case, the flow of fuel B is also inclined by the angle β and directed toward the ignition spark 11.

Figure 5:
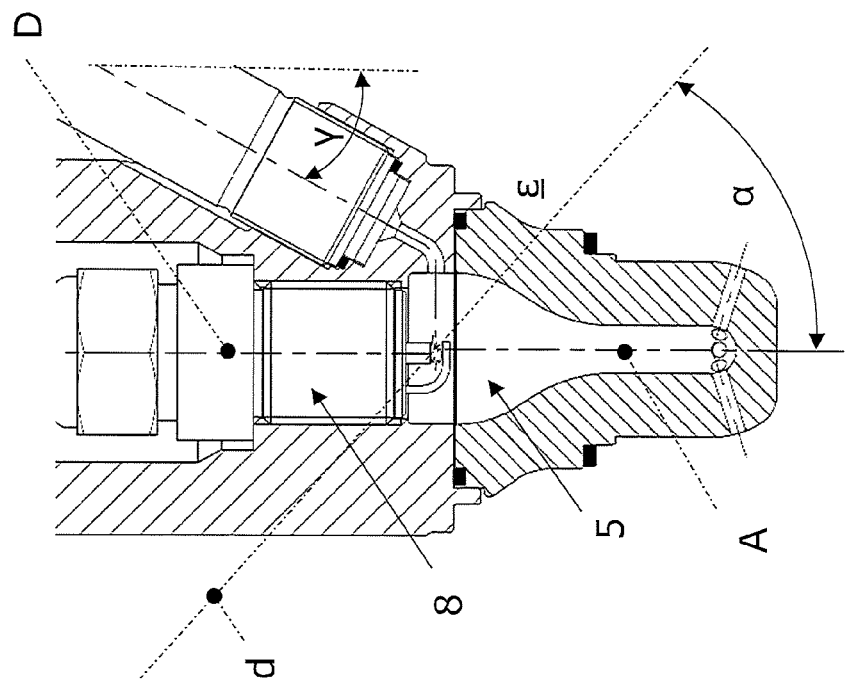
FIG. 5 shows a precombustion chamber component with a spark plug and a fuel valve of a cylinder head according to the invention in the first embodiment and the schematic indication of a third embodiment.

FIG. 5 shows an alternative axis of rotation d of the spark plug 8 for a third embodiment. This axis of rotation d has an inclination a to the axis A of the precombustion chamber.

In addition, an angle γ is drawn in this figure, which the axis V of the fuel valve 9 has to a straight line, which is parallel to the axis A of the precombustion chamber. The fuel valve 9 is inclined by the angle γ with respect to this straight line.

The cylinder head 1 is liquid-cooled. From FIG. 1 and FIG. 2, cooling chambers can be seen which are adjacent to the precombustion chamber component 2. This protects the spark plug 8, the precombustion chamber component 2 and the surroundings of these components of the cylinder head 2 from thermal damage and allows heat to be dissipated.

The invention claimed is:

1. Cylinder head of an internal combustion engine comprising:
   at least one spark plug having at least one earth electrode configured and arranged to form an ignition spark, and
   a precombustion chamber component configured and arranged to accommodate the spark plug and forms a precombustion chamber, and
   a fuel channel which leads into the precombustion chamber and is arranged in the precombustion chamber component, wherein a flow axis (S) of the fuel channel at an outlet is oriented in the direction of the earth electrode, so that substantially the entire fuel flow (B) flows to the earth electrode, and wherein the fuel channel is curved in at least one direction,
   wherein an axis of rotation (D) of the spark plug has an offset (x) with respect to an axis (A) of the precombustion chamber, and the offset (x) is between 0 and 15% of the greatest precombustion chamber diameter (g);
   wherein the flow axis (S) in the region of the outlet is arranged substantially normal to an axis (A) of the precombustion chamber, so that the incident flow of the ignition spark is substantially normal to the axis (A) of the precombustion chamber, and
   a fuel valve is arranged in the precombustion chamber component inclined with respect to a straight line parallel to the axis (A) of the precombustion chamber, wherein an inclination of the fuel valve is greater than or less than 0°.

2. The cylinder head of claim 1, wherein an axis of rotation (D) of the spark plug and the flow axis (S) of the fuel channel lie substantially in one plane (ε), and in that the flow axis (S) is curved substantially in this plane (ε).

3. The cylinder head of claim 1, wherein the curvature of the fuel channel encloses an angle (δ) between greater than 90° and 160°.

4. The cylinder head of claim 1, wherein the flow axis (S) in the region of the outlet is inclined substantially by an angle (β) with respect to a normal plane through the axis (A) of the precombustion chamber, so that the incident flow of the ignition spark is inclined substantially by an angle (β) with respect to the normal plane through the axis (A) of the precombustion chamber, wherein the angle (β) is between 0° and 30°.

5. The cylinder head of claim 1, wherein the outlet is arranged with the flow axis (S) at the level of the earth electrode along the axis (A) of the precombustion chamber.

6. The cylinder head of claim 1, wherein the precombustion chamber component includes a precombustion chamber shell that forms the precombustion chamber, and a sleeve around the spark plug, wherein the precombustion chamber shell and the sleeve are each formed integrally and/or are connected to one another.

7. The cylinder head of claim 1, wherein the flow axis of the fuel channel in a region of the fuel channel adjacent to the fuel valve substantially corresponds to the axis of rotation of the fuel valve.

8. The cylinder head of claim 1, wherein the offset (x) lies in the plane (ε) and the earth electrode is arranged facing away from the fuel channel by the offset (x) with respect to the axis (A) of the precombustion chamber.

9. The cylinder head of claim 1, wherein an axis of rotation (D) of the spark plug has an angle (α) with respect to the axis (A) of the precombustion chamber which is between 0° and 30°.

10. The cylinder head of claim 1, wherein the fuel channel is formed by a tubular recess along the flow axis (S) within the precombustion chamber component, so that the recess of the fuel channel is surrounded radially around the flow axis (S) by material of the precombustion chamber component.

11. The method according to claim 1, wherein a cutting of the spark plug thread for the spark plug in the precombustion chamber component is carried out in such a way that an earth electrode is arranged in a defined position with respect to the fuel channel after the screwing-in process.

12. The cylinder head of claim 1, wherein the internal combustion engine is formed as a gas engine.

13. The cylinder head of claim 1, wherein the offset between the axis of rotation (D) of the spark plug and the axis (A) of the precombustion chamber is between 0% and 10% of the greatest precombustion chamber diameter (g).

14. The cylinder head of claim 1, wherein the offset between the axis of rotation (D) of the spark plug and the axis (A) of the precombustion chamber is between 0% and 8% of the greatest precombustion chamber diameter (g).

15. The cylinder head of claim 1, wherein the offset between the axis of rotation (D) of the spark plug and the axis (A) of the precombustion chamber is less than 7% of the greatest precombustion chamber diameter (g).

16. The cylinder head of claim 1, wherein the inclination corresponds to an angle (γ) between −10° and +35°, excluding 0°.

17. The cylinder head of claim 1, wherein the curvature of the fuel channel encloses an angle less than 90 degrees, or an angle between 80 degrees and 90 degrees.

18. The cylinder head of claim 1, wherein the fuel valve is inclined with respect to the axis of the precombustion chamber, wherein this inclination preferably corresponds to an angle of less than 0 degrees, or an angle between −10 degrees and 0 degrees.

19. Cylinder head of an internal combustion engine comprising:

at least one spark plug having at least one earth electrode configured and arranged to form an ignition spark, and a precombustion chamber component configured and arranged to accommodate the spark plug and forms a precombustion chamber, and a fuel channel which leads into the precombustion chamber and is arranged in the precombustion chamber component, wherein a flow axis (S) of the fuel channel at an outlet is oriented in the direction of the earth electrode, so that substantially the entire fuel flow (B) flows to the earth electrode, and wherein the fuel channel is curved in at least one direction, wherein an axis of rotation (D) of the spark plug has an offset (x) with respect to an axis (A) of the precombustion chamber, and the offset (x) is between 0 and 15% of the greatest precombustion chamber diameter (g), wherein the flow axis (S) in the region of the outlet is arranged substantially normal to the axis (A) of the precombustion chamber, so that the incident flow of the ignition spark is substantially normal to the axis (A) of the precombustion chamber, and a fuel valve is arranged in the precombustion chamber component inclined with respect to a straight line parallel to the axis (A) of the precombustion chamber, wherein an inclination of the fuel valve is greater than or less than 0°, and wherein the flow axis (S) of the fuel channel between the region of the outlet and the fuel valve is inclined at a same angle as the fuel valve.

* * * * *